Jan. 20, 1970  R. A. GANGE  3,491,345
CRYOELECTRIC MEMORIES EMPLOYING LOOP CELLS
Filed Oct. 5, 1966  7 Sheets-Sheet 1
Fig. 1.
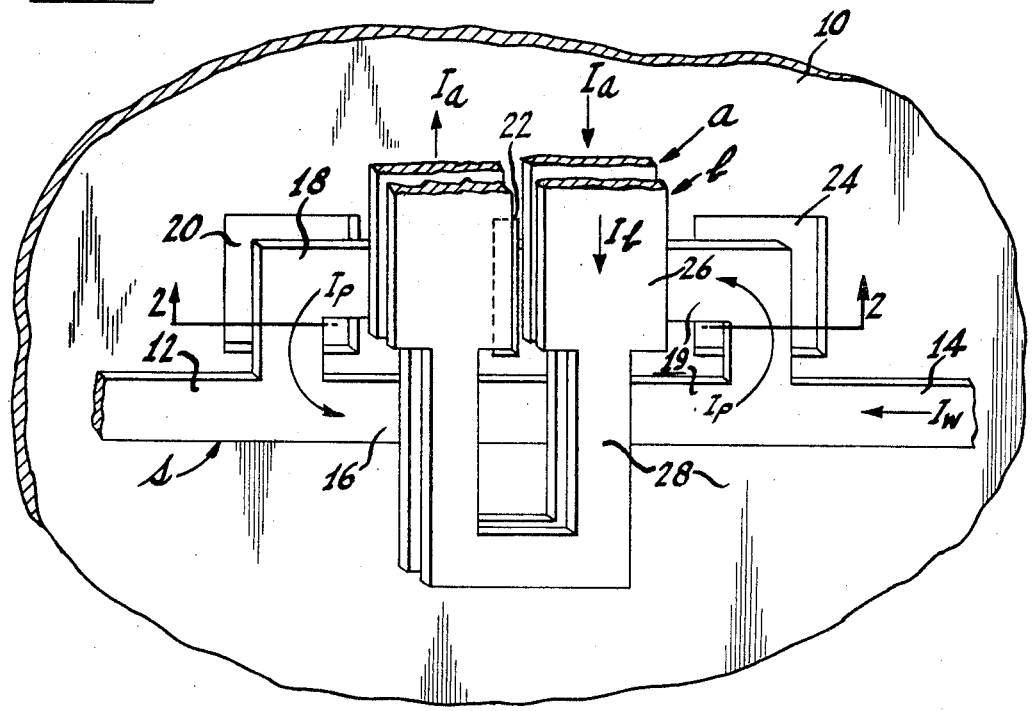
Fig. 2.
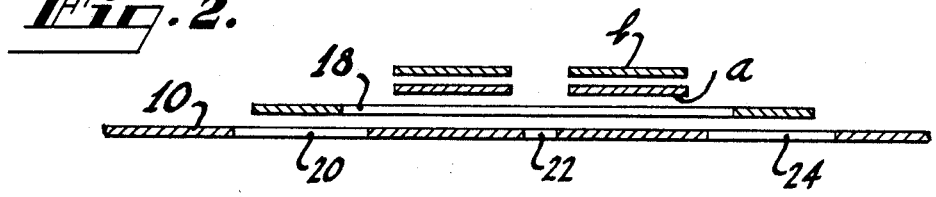
Fig. 3.
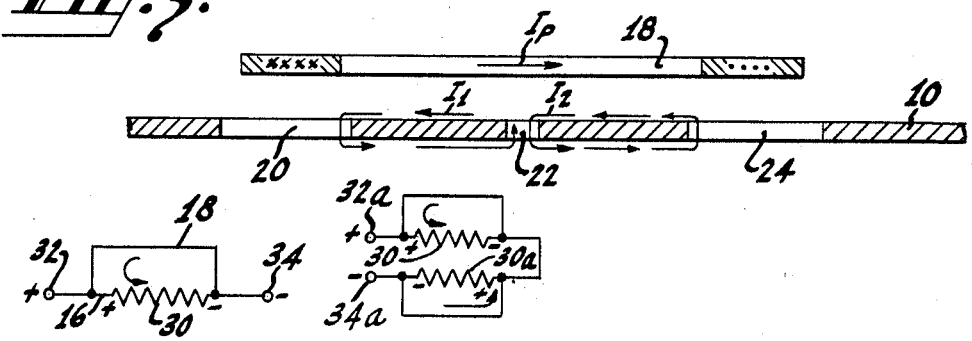
Fig. 4.  Fig. 5.
Inventor:
ROBERT A. GANGE
By Samuel Cohen
Attorney Jan. 20, 1970 R. A. GANGE 3,491,345
CRYOELECTRIC MEMORIES EMPLOYING LOOP CELLS
Filed Oct. 5, 1966 7 Sheets-Sheet 2
Fig. 6.
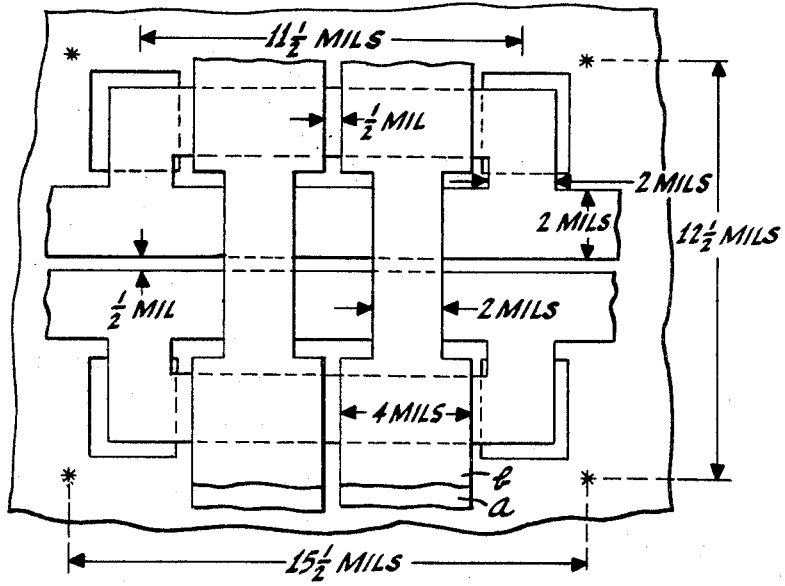
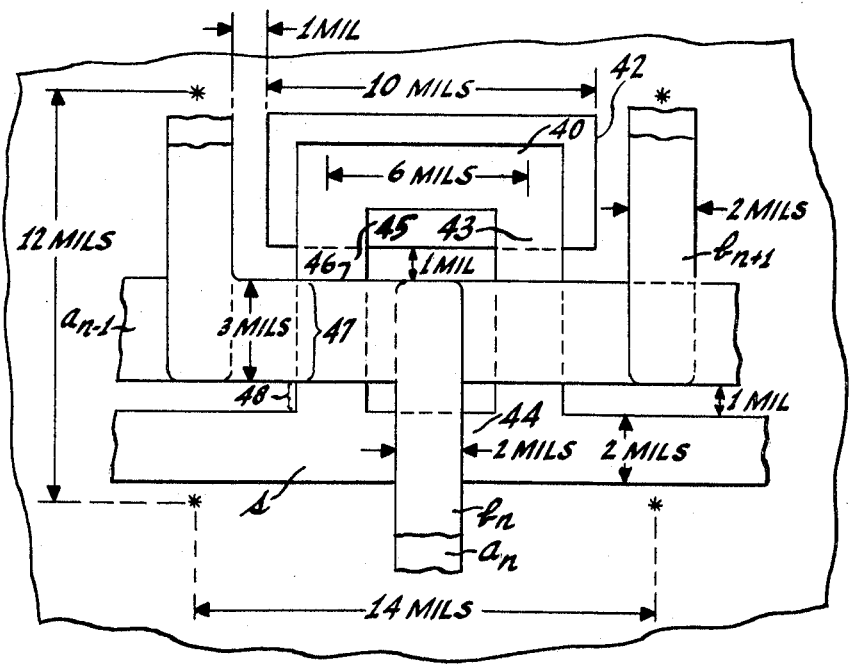
Fig. 7.
Inventor:
ROBERT A. GANGE
By
Attorney Inventor:
ROBERT A. GANGE

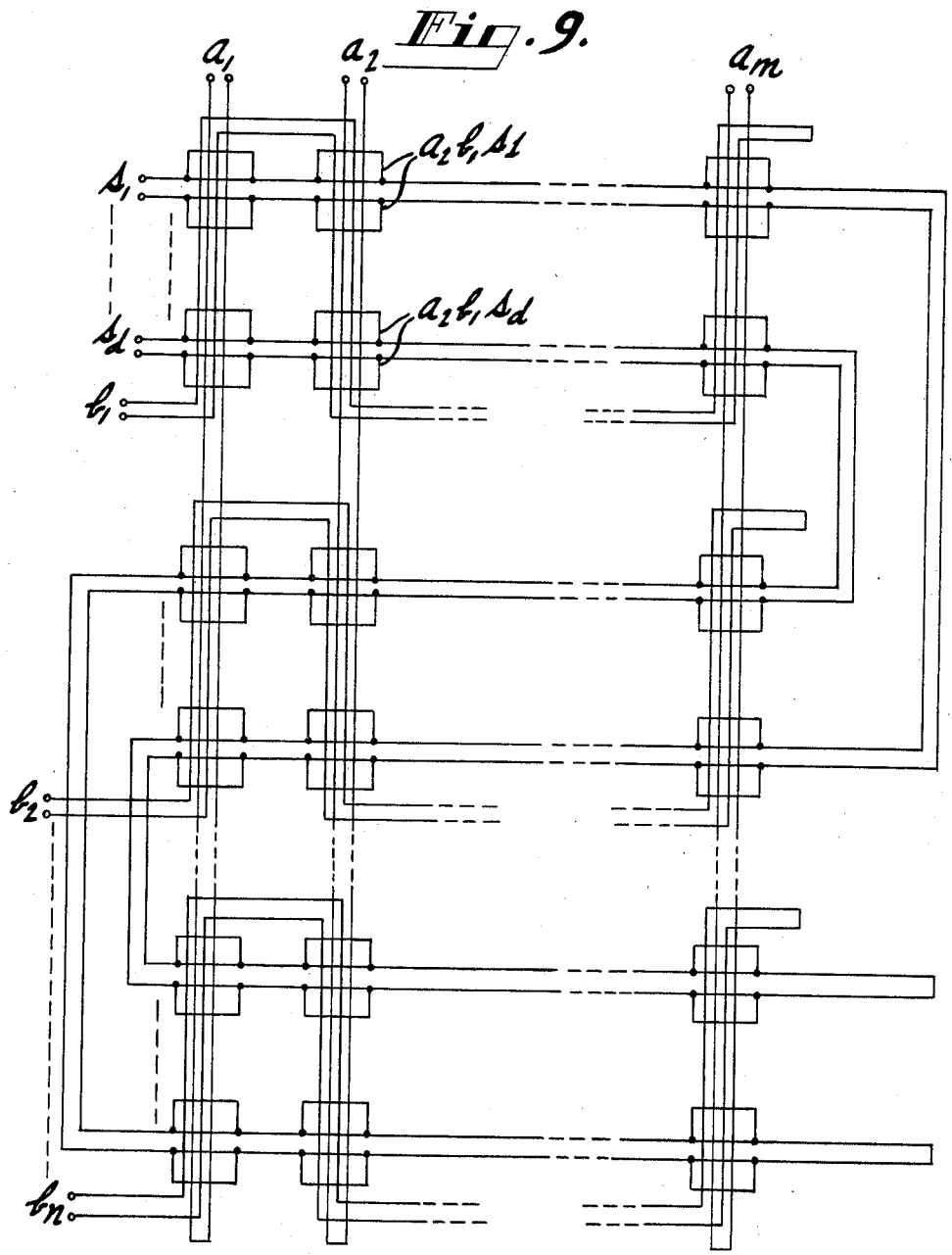

Jan. 20, 1970   R. A. GANGE   3,491,345
CRYOELECTRIC MEMORIES EMPLOYING LOOP CELLS
Filed Oct. 5, 1966   7 Sheets-Sheet 6

Inventor:
ROBERT A. GANGE
By
Attorney

United States Patent Office 3,491,345
Patented Jan. 20, 1970

3,491,345
CRYOELECTRIC MEMORIES EMPLOYING LOOP CELLS
Robert A. Gange, Belle Mead, N.J., assignor to RCA Corporation, a corporation of Delaware
Filed Oct. 5, 1966, Ser. No. 584,433
Int. Cl. G11b 9/00
U.S. Cl. 340—173.1
6 Claims

ABSTRACT OF THE DISCLOSURE

A superconductor ground plane formed with a plurality of apertures therein and a plurality of storage loops lying over and insulated from the ground plane. Each loop includes two paths, one a relatively high inductance path which passes over at least two apertures in the ground plane and the other a relatively low inductance path which does not lie over any apertures in the ground plane. There is at least one drive lead which passes over each loop. It comprises an outgoing and return conductor, both carrying the same drive current, both passing over the two paths of a loop, and both passing over the region of the high inductance path located between two apertures.

This invention relates to new and improved cryoelectric storage elements and to memories incorporating such elements.

A storage element according to the invention includes a superconductor ground plane formed with at least two apertures therein. Storage loop means also formed of a superconductor material lies over and is insulated from the ground plane. The loop means includes an input lead, an output lead and first and second current paths in parallel extending between these leads. One portion of the first path lies over one aperture and a second portion of the first path lies over the other aperture. The storage element also includes at least one superconducting drive lead which passes over the region of the ground plane between the two apertures therein and which cross(es) both paths of the storage loop means.

An important feature of the storage element of the invention is that the path of the storage loop means passing over the two apertures in the ground plane exhibits a relatively large inductance whereas the drive leads, even through passing directly over the storage loop, continue to exhibit a relatively low inductance. Other features of the invention are its suitability for high packing density and its ability to produce a sense signal of relatively high amplitude. Memories employing the storage elements of the invention may be organized to minimize so-called common-mode noise and have other important advantages which will be pointed out in detail below.

The invention is shown in the following drawings of which:

FIGURE 1 is a perspective schematic showing of a cryoelectric storage element according to the invention;

FIGURE 2 is a section taken along line 2—2 of FIGURE 1;

FIGURE 3 is a section taken through the storage element of the invention to help explain its operation;

FIGURES 4 and 5 are equivalent circuits of the memory cell of the invention;

FIGURE 6 is a plan view of two memory elements according to the invention, showing actual dimensions of one embodiment of the invention;

FIGURE 7 is a plan view of a memory cell which was developed prior to the memory cell of the present invention showing some of the dimensions of the cell;

FIGURE 9 is a schematic showing of another memory arrangement according to the invention;

Figure 8:
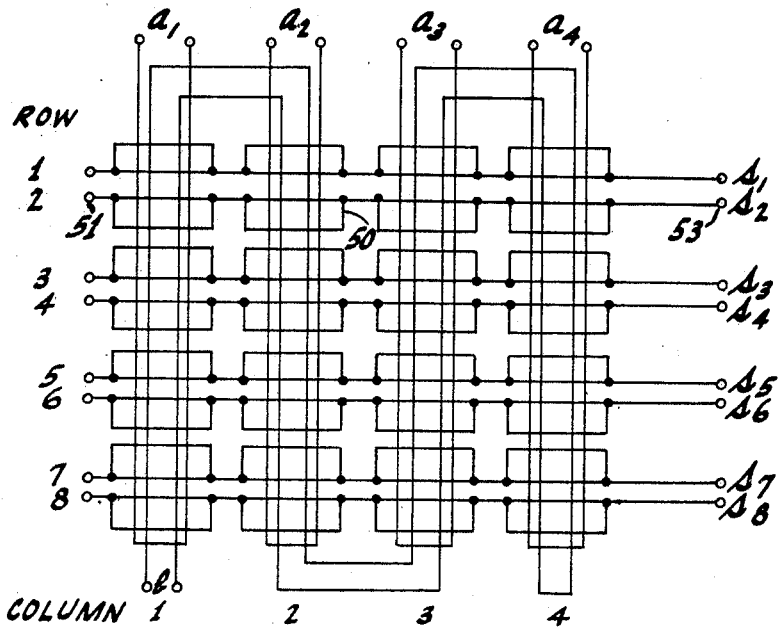
FIGURE 8 is a schematic drawing of memory organization according to the invention.

In the discussion which follows, a cryogenic environment for the storage elements, memory plane and certain other components, is assumed. This may be achieved by immersing these components in a liquid helium bath and controlling the vapor pressure of the surface of the bath as in well understood in the art.

The storage element of the invention, shown in FIGURES 1 and 2, includes a ground plane 10 which may be formed of a superconductor such as lead and a sense line $s$ formed of a superconductor such as tin. The sense line includes an input lead 14, an output lead 12 and two parallel current paths 16 and 18 which form a storage loop 19 for persistent current The current path 18 passes over three spaced apertures 20, 22 and 24 in the ground plane whereas the current path 16 does not pass over any apertures in the ground plane.

There are two drive lines $a$ and $b$, formed of a superconductor such as lead, which pass over the storage loop. Each line is approximately twice as wide in the regions 26 thereof which pass over the path 18 than in the regions 28 thereof which pass over the path 16. Each drive line crosses each current path in two different places, however, the portions of the drive line located over path 18 lie between the apertures 20, 22 and 22, 24, respectively and do not pass over these apertures. The drive lines are insulated from one another, from the ground plane, from the sense lines $s$ and from the loop 16, 18. The loop is also insulated from the ground plane 10. The insulation may be a thin film of silicon monoxide or the like, however, for the sake of drawing clarity this insulation is not shown explicitly. The various tin and lead lines are also in the form of thin films.

To write information into the memory cell of FIGURE 1 to write current $I_w$ is applied to the sense line $s$ and drive currents $I_a$ and $I_b$ are applied to the lines $a$ and $b$, respectively. For the sake of the present explanation, it may be assumed, arbitrarily, that the various currents are applied in the directions shown by the arrows, however, it is to be understood that other current directions could be used instead. The write current $I_w$ divides among the paths 16 and 18 in accordance with the inductance exhibited by each path. As will be explained in greater detail shortly, the current path 18 exhibits a much higher inductance than the path 16 and accordingly the major portion, actually substantially all of the write current $I_w$, flows into path 16.

The drive currents $I_a$ and $I_b$ applied to the $a$ and $b$ lines, respectively, cause magnetic fields to be produced which are additive in the regions where the two lines lie over one another. Because each strip is twice as wide over the high inductance path 18 of the loop than over the low inductance path 16 of the loop, the density of the drive current passing through these wide regions is approximately one-half that of the density of current passing through the regions of the strip over path 16. Accordingly, the magnetic field intensities produced at the wide and narrow portions of the strips are the ratio of approximately 1:2. This means that the drive current amplitudes can be so chosen that the magnetic field which results at the low inductance path 16 is sufficient to drive that path to the normal (resistive) state, whereas the magnetic field intensity due to the drive currents at the high inductance path 18 of the loop is insufficient to drive path 18 normal. In practice, equal amplitude currents which perform this function are applied to the *a* and *b* lines, and since path 18 remains superconducting while path 16 is driven to the resistive state, substantially all of the write current $I_w$ decays out of the path 16 and steers into the high inductance path 18.

The drive currents $I_a$ and $I_b$ are now removed while the write current $I_w$ is permitted to continue to flow. The removal of the drive currents permits the low inductance path 16 to return to the superconducting state and the flux due to the write current in path 18 becomes trapped by the loop 19. Subsequent to the return to the superconducting state of path 16, the write current is removed. The collapse of the trapped magnetic flux which threads loop 19 induces a current in the loop. This current is persistent due to the zero resistance of the loop and supports the flux trapped therein. This persistent current $I_p$ circulates in loop 19, around paths 18, 16 in the counterclockwise direction as indicated by the arrows legended $I_p$.

The data represented by the stored persistent current (or the absence of a persistent current) may be read out of the loop by applying read currents to the *a* and *b* drive lines in the directions indicated by the arrows $I_a$ and $I_b$, in the absence of write current $I_w$ in the sense line. The two read currents drive the two portions of the path 16 normal again at the regions beneath the *a* and *b* lines. If the loop is storing a persistent current (this is indicative of the storage of a binary digit of given value, such as a 1), this current is caused to die out when a portion of the storage loop is driven normal and, in the process, a voltage develops across the loop which may be detected as a sense voltage across the outer terminals of the sense line *s*. If no persistent current is present (this is indicative of the storage of a bit of the other binary value, such as a 0), no sense voltage develops when the path 16 is driven normal.

The above is illustrated schematically in FIGURE 4. The resistor 30 in path 16 represents the sum of the two normal areas created when the coincident read currents $I_a$ and $I_b$ are applied to the *a* and *b* lines (these lines are not shown in FIGURE 4). The sense voltage due to the dying persistent current, when such a current is present, develops across the resistor in the polarity indicated. The path 18 of the loop acts like an inductance of value $L_H$ and the sense voltage $$L_H \frac{dI_p}{dt}$$

where $dI/dt$ is the rate of decay of the persistent current, therefore appears across this inductance and across the terminals 32 and 34 of the sense line. This voltage is relatively positive at terminal 32 and relatively negative at terminal 34.

The reason the path 18 of FIGURE 1 exhibits a relatively high inductance can be explained with the aid of FIGURE 3. The persistent current $I_p$, passing through the portion 18 of the loop, flows along the surface of the tin in proximity to the ground plane, and causes an image current to flow in the upper surface of the ground plane 10. If there were no apertures in the ground plane, the return path for substantially all of this image current would also occur on the upper surface of the ground plane, beneath path 16, and the magnetic field due to this image current would be confined between loop 19 and the ground plane. The ground plane, in other words, would act like a perfect shield for the loop and the loop, including path 18, would have a relatively low inductance.

However, in the memory cell of the present invention, three holes 20, 22 and 24 are placed in the ground plane beneath the current path 18. The image currents $I_1$, $I_2$ induced in the ground plane by the persistent current $I_p$ are unable to flow continuously beneath loop 19, and because of the discontinuity afforded by the apertures, must now complete their return path by flowing on the underside of the ground plane as illustrated by the arrows. The return path beneath the ground plane of the image of the persistent current permits the flux associated with this current to permeate all of space. Thus, the effect of these three relatively small apertures, with respect to the path 18, is that of a continuous aperture extending from aperture 20 through aperture 24 and the path 18 therefore is virtually unshielded in the region thereof between these holes, and exhibits a relatively high inductance.

While the effect discussed above is enhanced by the use of three holes 20, 22 and 24, in another embodiment of the invention, illustrated in FIGURE 6, the hole 22 is absent. The inductance exhibited by the path 18 is only slightly lower than that of the embodiment of FIGURE 1. A cell having only two holes 20 and 24 is found to produce a sense signal of an amplitude approximately 85 to 90 percent of that of a cell with three holes.

While it is advantageous, as will be discussed in greater detail later, to make the inductance of the high inductance path of the loop as high as possible to achieve a sense signal which is of relatively high amplitude, the inductance exhibited by the drive leads should be maintained relatively low. Otherwise, the drive lines are linked by high flux during application of the interrogate currents $I_a$ and $I_b$. This high flux tends to be trapped along the edges of the drive lines and at points of imperfection in the ground plane. This trapped flux biases the drive strips in a manner which tends to cancel the applied field due to the currents $I_a$ and $I_b$, thereby requiring greater values of $I_a$ and $I_b$ during successive read-write cycles. The higher values of $I_a$ and $I_b$ trap additional flux and so on until the memory becomes inoperative.

In addition, the higher the inductance of a drive line, the fewer memory cells a given source of drive current can handle. Thus, for a memory of given size, the higher the drive line inductance, the greater the number of drive current sources needed and the higher the costs. Moreover, when the drive line inductance is high, the high flux density present during application of the interrogate currents $I_a$ and $I_b$ tends to activate cells in proximity to the drive lines. This means that the cell packing density must be decreased to avoid cell-to-cell interaction.

When the drive line inductance is relatively low, the operating speed of the memory may be relatively high. Low inductance drive leads permit the drive currents (both read and write) to reach the memory locations without excessive delays.

It is also important that the current density in the drive leads be uniform over the width of the leads. If not, it becomes possible for the line to be driven resistive by the drive current itself and this is undesired because it results in excessive power dissipation, heat, and decreased drive current amplitude.

When a drive lead is over the ground plane, its inductance is low and the drive current spreads uniformly over the width of the drive lead. When a drive lead is not shielded, that is, when it passes over an aperture in the ground plane, its inductance increases and the current passing through the drive lead tends to concentrate at the edges of the drive lead. This concentration of current means that the edges of the lead located over an aperture can be driven to the normal state by an amount of drive current which, in the absence of the aperture, would be insufficient to switch the lead to its normal state.

In the memory element of the present invention, the drive leads do exhibit a low inductance and they do not, pass over the apertures in the ground plane. From the explanation given in connection with FIGURE 3, it may be seen that the image currents induced in the ground plane due to the drive currents $I_a$ and $I_b$, are in a direction such that they do not pass through the apertures in the ground plane and they do not return on the underside of the ground plane. Instead, they remain on the top surface of the ground plane beneath the drive strips. In a memory system employing a plurality of memory elements, the drive strips are arranged to pass off the ground plane relatively close to one another so that the return paths for these image currents are short and occur on the top surface of the ground plane.

To appreciate some of the more subtle advantages of the present arrangement over other storage cells requires an understanding of what has gone before. One previously known memory cell which exhibited relatively good performance is shown in FIGURE 7. Wherever possible, the leads are 2 mils wide. The high inductance path is shown at 40 and the aperture in the ground plane lying beneath this path is shown at 42. The portion of a high inductance path 40 which lies over the aperture 42 is approximately 8 mils in length and the inductance exhibited by this path is found experimentally to be approximately proportional to the portion of this length lying between the centers of the legs 43 and 45, that is, proportional to about 6 mils.

As already mentioned, it is necessary that the inductance of the $a$ and $b$ drive leads be maintained relatively low and that the current density in these leads be uniform. Since the aperture 42 extends across the entire width of the path 40 and since it is disadvantageous to have the drive leads pass over this aperture, for the reasons already discussed, it is necessary that these drive leads take a meandering path. The drive lead $b_n$, for example, extends in one direction over the low inductance path 44, then turns to the left to avoid passing over the aperture 42, then turns to the right again so that it passes alongside of the aperture 42. Thus, of the area taken up by a memory location, only some is occupied by the storage loop and the remainder by drive leads.

The persistent current in path 40 tends to concentrate at the edges of the path 40 in the region thereof over the aperture 42. For this reason, it is found necessary, in practice, to space the $a$ and $b$ drive leads one mil from the aperture at, for example, 46. This permits the persistent current density to become more uniform in the region where the drive lines pass over the loop and lessens the tendency of the loop to be driven normal by a half-select current—a current in only one of the two drive lines. For the same reason, the strip $b_n$ is made three rather than two mils wide in the region 47 as this reduces the drive current density and the corresponding magnetic field intensity. In practice, it is also found necessary to space the drive lead at least 1 mil from the corners of the loop as, for example, at 48. This is because the persistent current density tends to build up at the corners of the loop and a spacing smaller than this can result in undesired selection of the loop (driving of the loop normal) by a half-select current.

For the above and a number of other reasons not necessary to discuss in detail here, the dimensions shown in FIGURE 7 represent a practical design of a memory cell which employs leads 2 mils wide. Each memory location occupies an area 14×12 mils, an area of 168 square mils. The packing density for a memory plane in which the pattern shown is repeated many times is 5952 memory cells per square inch. The high inductance path of each loop has a measured inductance of about 70 picohenries which is found to correspond to an effective unshielded region of roughly 6 mils, as already indicated.

A pair of cells, according to the present invention, is shown in FIGURE 6. The portion of the high inductance leg of each loop which is effectively located over an aperture, is approximately 12½ mils long and the portion of this length to which its inductance is roughly proportional is 11½ mils. Sense signal amplitude measurements indicate that the inductance, in this case, is between 120 and 180 picohenries. It may also be observed that because the $a$ and $b$ drive leads pass directly over the loops and need not occupy any separate area, the packing density which is possible is relatively high—much higher than that of the memory element shown in FIGURE 6. The practical design illustrated shows that two memory cells occupy an area of 15½×12½ mils or 194 square mils.

If a memory employing the cells of FIGURE 6 is arranged to employ one storage element per bit, the packing density which is possible with the arrangement of FIGURE 6 is 10,320 cells per square inch, almost double that of the previous design. Thus, not only is the packing density higher, but the sense signal as well. On the other hand, as will be discussed in detail shortly, a memory, according to the present invention, may be designed to employ two loops per bit. In a memory of this type, 5160 bits may be stored per square inch.

An important advantage of the memory above employing 2 loops per bit is that the total inductance exhibited by the two high inductance paths of the two loops, is proportional to approximately 21 mils so that the sense signal which is produced has an amplitude almost four times that of the sense signal produced in a memory cell such as shown in FIGURE 7. (This assumes that the persistent current stored in each loop in the arrangement of FIGURE 6 is of the same amplitude as the persistent current stored in the loop of FIGURE 7, which is a valid assumption.)

An equivalent circuit of two loops, interconnected to store a single bit, appears in FIGURE 5. The two loops are connected in series and persistent current flows in the same direction in both loops. When coincident write currents are applied simultaneously to both loops, driving both loops normal, the persistent currents decay across the resistive areas 30a and 30 to produce voltages in the polarity shown. These are additive and result in an output sense voltage which is relatively positive at terminal 32a and relatively negative at terminal 34a.

Up to this point, the question of sense signal amplitude has been discussed at some length. Now, another important parameter—signal-to-noise ratio, will be discussed as a function of the cell size and other cell characteristics.

It can be shown that the time constant K of a loop cell is:

$$K=\sqrt{\left(\frac{L_H+L_L}{R_0}\right)t_0}=\sqrt{Tt_0}$$

where:

$t_0$ is the time required for the resistance of the cell to go from its initial value of zero resistance to its final value of full resistance $R_0$ in response to the applied magnetic field due to the coincident drive currents;

$L_H$=the inductance of the high inductance path of the loop; and $L_L$=the inductance of the low inductance path of the loop.

In the equation above, since $L_H$ is much, much greater than $L_L$, the latter is generally ignored and the cell time constant reduces to $$K \doteq \sqrt{\left(\frac{L_H}{R_0}\right)t_0}$$

The term $t_0$, in the expression represents the normal state nucleation time of the tin and is independent of the cell size.

As the cell size goes down, the time constant K of the cell decreases. This means that a greater portion of the energy contained in the sense signal which is generated during the readout of a memory cell occurs at its higher frequency components. The generation of a sense signal, a substantial portion of whose energy resides in its high frequency components, implies that a sense amplifier will be required which is of greater bandwidth than the sense amplifier which would be needed for a cell having a relatively low time constant. As the bandwidth of the sense amplifier increases, the amount of "white" noise amplified by the sense amplifier increases correspondingly and, for a given sense signal amplitude, the signal-to-noise ratio decreases.

In the memory cell illustrated in FIGURE 7, the inductance exhibited by the high inductance path is proportional to the "effective" hole length (approximately 6 mils) and the resistance $R_0$ is proportional to the width of the $a$ and $b$ drive line (approximately 2 mils) where they cross over the low inductance path 44, divided by the width of the path. If one were to shrink the cell of FIGURE 7 and therefore the hole length by a factor of two, one would decrease $L_H$ by a factor of two also, but $R_0$ would remain the same as would $t_0$. As K, the time constant is substantially equal to $$\sqrt{\frac{L_H}{R_0} \cdot t_0}$$

the time constant would decrease by a factor of $\sqrt{2}$.

In the memory cell of the present invention, shown in FIGURE 6, the inductance exhibited by the high inductance path of a given loop is roughly double that of the cell of FIGURE 7 for the same line widths. The resistance $R_0$, which is introduced in response to the coincident $a$ and $b$ drive currents, is proportional not to $$\left(\frac{2 \text{ mils length of area driven normal}}{2 \text{ mils width of area driven normal}}\right)$$

as in the cell of FIGURE 7, but rather to twice this quantity, as each drive current passes over the low inductance leg of the loop in two different places, each approximately 2 mils wide and 2 mils long. Therefore, the time constant K of the cell of FIGURE 6 is somewhat larger than that of the cell of FIGURE 7, even though it occupies only about 60% of the area of cell of FIGURE 7. Thus, in addition to the signal-to-noise ratio of the cell of the present invention being better than that of the cell of FIGURE 7, the cell of the present invention occupies only slightly more than one-half the space of the cell of FIGURE 7, and the sense signal amplitude of the cell of the present invention is almost double that of the cell of FIGURE 7.

Another advantage of the memory cell of the present invention is its ability to drive the path 16 of the storage loop normal at a relatively low value of drive current. Theory indicates that in the case of a single lead drive line, located immediately adjacent to a tin line and over a ground plane, at an operating temperature of 3.5° Kelvin (all as in the case in the memory cell of the invention) a drive current density of 100 milliamperes per mil of width of drive line should be sufficient to switch the tin line to the normal state. (In the cell of the present invention there are, of course, two closely coupled drive lines and coincident currents are applied to these lines. In this case, theory indicates that each line should carry 50 milliamperes of current per mil of line width to drive the tin line normal.)

Calculations indicate that the cell shown in FIGURE 7 requires 212 milliamperes per mil of width of drive line (106 milliamperes per mil in the $a$ line 106 milliamperes per mil in the $b$ line) to switch the tin in current path 44 to the normal state. (These calculations are based on actual measurements of a scaled-down version of the cell of FIGURE 7 which employed two 1.7 mil drive lines and which required 180 milliamperes in each line to switch the tin.) It is not certain why this occurs, however, according to one theory, the sharp bends in the $a$ and $b$ lines cause these portions of the line to exhibit a relatively higher inductance on the under surface of the line. This is thought to cause a portion of the drive current to distribute on the upper surface of the line and this, in turn, means that the current density available for switching, that is, the current density on the drive line surface adjacent to the tin, is less than it should be. For this reason, a greater amount of drive current must be employed than that theoretically predicted to cause the switching to occur.

In the present arrangement of FIGURE 6, it has been found that the current density required to switch the low inductance path of the tin loop to the normal state is about 150–180 milliamperes per mil of width in the case of a single drive strip. The reason, it is believed, is that a drive strip of the present cell has no bends, even though the line is of different widths at different regions thereof. As there are no bends in the line, there are not as abrupt differences in line inductance along the length of the line as in the cell of FIGURE 7. Therefore, more of the drive current distributes on the under side of the line than in the case of the cell of FIGURE 7. Regardless of the reason why the drive currents required in the cell of FIGURE 6 are lower than that of the previous cell, this has been found to be the case and this is advantageous as it means somewhat lower power dissipation and somewhat lower noise.

One form of a memory organization, according to the present invention, employing a single loop per bit, is shown in FIGURE 8. For purposes of illustration, the memory is shown to have four columns and eight rows. However, it is to be understood that the memory may be much larger than this, and a multiplicity of $b$ lines may be employed. The memory includes an $a$ line per column, an $s$ line per row, and a $b$ line which is coupled to all of the memory locations shown in FIGURE 8. Information may be written into a particular memory location, such as loop 50 which is in column 2 and row 2, by applying drive currents to lines $a_2$ and $b$ and applying a write current to row 2 in the manner already discussed. Information may be read out of a location, such as 50, by applying drive currents to lines $a_2$ and $b$. The sense signal which is produced appears at terminals 51 and 53 of sense line $s_2$.

FIGURE 9 illustrates another form of memory organization according to the invention. Here, there is a separate $a$ line for each column. There are "$d$" $s$ lines, where $d$ may be some number such as 16 or 32 or 64, as examples, and there are "$n$" $b$ lines where $n$ may be some number such as 16, 32 or 64, as examples. Each $b$ line is coupled to a given segment of all columns of loops and to $d$ rows of loops in this segment. Each memory location consists of two loops.

Information may be written into a group of $d$ pairs of loops $a_2 b_1 s_1$ through $a_2 b_1 s_d$ by applying drive currents to lines $b_1$ and $a_2$ concurrently with the application of (independent) write currents to particular ones of lines $s_1$ through $s_d$ and then removing these currents in the appropriate order, as already discussed in connection with FIGURE 1. Thereafter, this group of pairs of loops may be read out by applying drive currents to lines $b_1$ and $a_2$. (It is to be understood that here and elsewhere, a bit of given value, such as a 1, may be written into a memory location by applying a write current to the $s$ line associated with that location concurrently with the application of the $a$ and $b$ currents associated with that location and that a bit of the other value such as a zero may be written into a memory location by applying no current to the $s$ line associated with that location during the application of the coincident $a$ and $b$ currents.)

Figure 10:
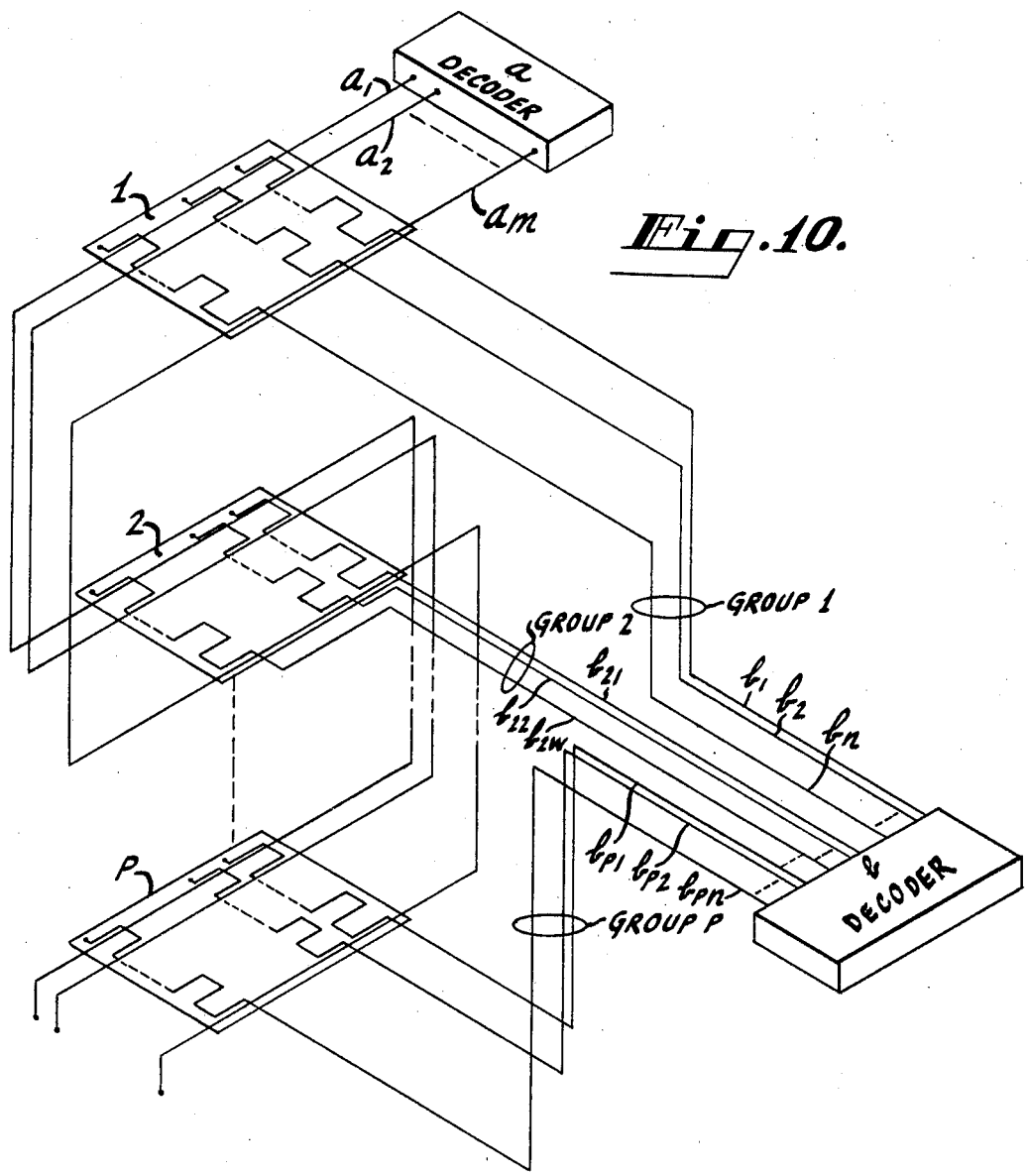
FIGURE 10 is a schematic, perspective showing of a memory arrangement for a stack of memory planes in accordance with the invention.

FIGURE 10 illustrates schematically, the arrangement of $a$ and $b$ lines in a stack of memory planes. To avoid confusion in the drawing, the $s$ lines are shown separately in FIGURE 11. (FIGURE 11 also shows only one of the $b$ lines, namely line $b_1$.) Note that in these two figures a single line is employed to represent two lines— the "outgoing" and "return" paths for the drive current. When a line ends in the figure, this indicates that the line is folded back on itself and returns to the same decoder from which it originated along the same path as is shown.

Figure 11:
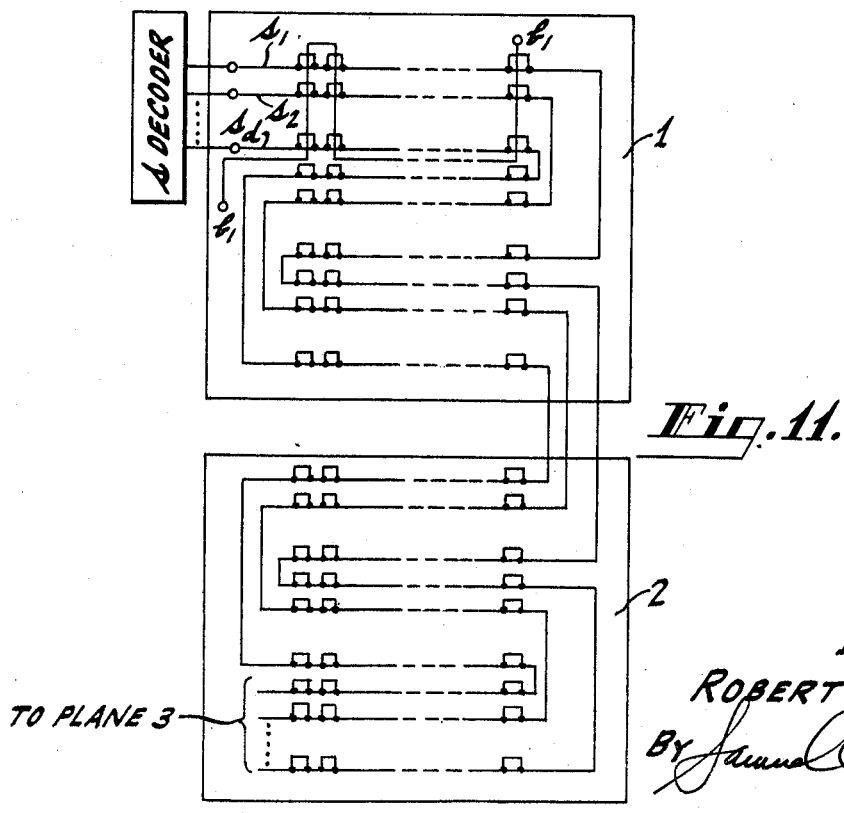
FIGURE 11 is a plan view of two of the memory planes of FIGURE 10 showing, schematically, the arrangement of sense ($s$) lines.

It may be observed from FIGURE 10 that each $a$ line, such as $a_1$, passes over a plurality of planes—planes 1 through P in the illustration. Each group of $b$ lines such as $b_1$, $b_2$ . . . $b_n$ lies on a single plane. FIGURE 11 shows that the group of $s$ lines $s_1$ through $s_d$ passes back and forth a number of times over a plurality of planes.

In the operation of the system of FIGURES 10 and 11, it is possible to write a word at a time on any plane desired. For example, to write the word $a_1$, $b_{21}$ on plane 2, the $a$ and $b$ decoders apply drive currents to these two lines, respectively, during the time the $s$ decoder of FIGURE 11 applies separate write currents to particular ones of the group of $s$ lines $s_1$ through $s_d$ in the manner already discussed.

Figure 12:
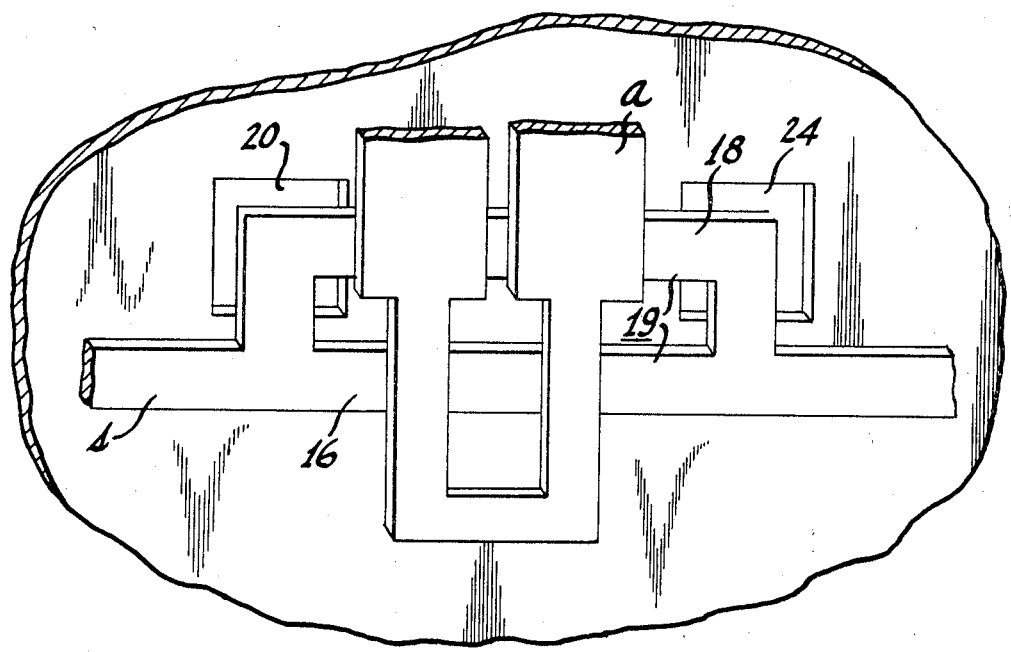
FIGURE 12 is a perspective view of a second embodiment of the memory element according to the invention.

FIGURE 12 illustrates a memory element, according to the present invention, which is suitable for a word-organized memory. This memory element is the same as the one of FIGURE 1 except that only a single drive line, shown as the $a$ line, is needed. There may be a third hole present corresponding to 22 of FIGURE 1, however, only two holes 20 and 24 are illustrated. This memory element operates in the same way as the memory element of FIGURE 1 except that the current supplied to the $a$ line must be of an amplitude sufficient to drive the low inductance path 16 of loop 19 to the normal state and insufficient to drive the high inductance path 18 to the normal state.

Figure 13:
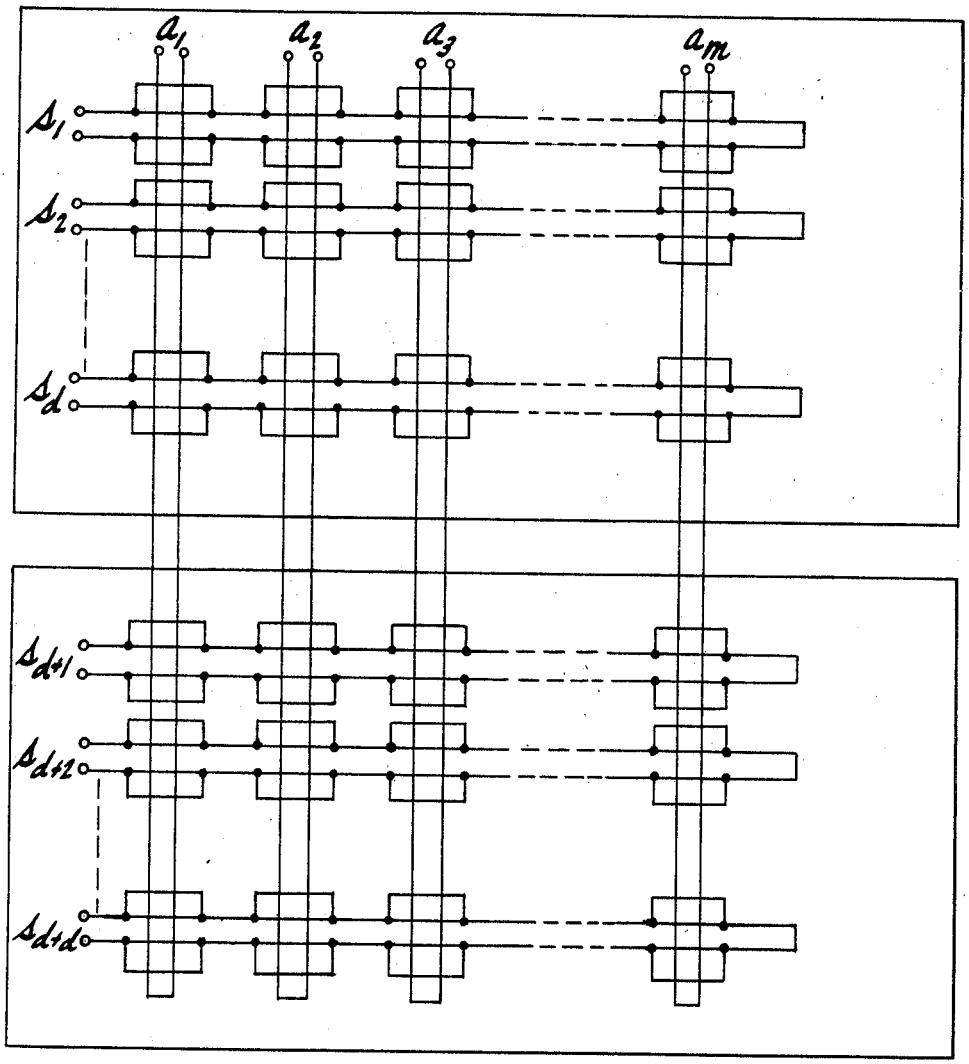
FIGURE 13 is a schematic showing of a word-organized memory according to the invention which employs the memory element of FIGURE 12.

Two planes of a word-organized memory, according to the invention, which employ the memory cells of FIGURE 12, are shown in FIGURE 13. This memory like the one of FIGURES 9–11, employs two loops per storage location, however, one loop per cell may be employed instead. A word at a time may be written into the memory by energizing a selected $a$ line concurrently with the energization of selected ones of the $s$ lines. For example, information may be written into location $a_3$ by applying drive current to line $a_3$ concurrently with the application of write currents to selected ones of the lines $s_1$ through $s_d$ and $s_{d+1}$ through $s_{d+d}$, then removing the current applied to the $a_3$ line followed by removal of the currents applied to the $s$ lines. The memory location $a_3$ may be read out by applying a drive current to line $a_3$ and sensing the ends of lines $s_1$ through $s_d$ and $s_{d+1}$ through $s_{d+d}$ for the presence of sense signals.

The word organization of FIGURE 13 is only illustrative of other possible arrangements. For example, there may be many more planes than are shown arranged in a single stack. As a second alternative, there may be additional planes to the right of the plane shown in FIGURE 13 with additional $a$ lines for the added columns and with the $s$ lines connected from the planes shown in FIGURE 13 to the planes (not shown) at the right of the ones shown.

In the various memory systems of the present invention, each drive line consists of two side-by-side conductors, an "outgoing" conductor which carries current from the drive current source to the memory element and a "return" conductor which returns the drive current to the source. This feature substantially reduces the capacitive noise coupled into the sense circuit and accordingly greatly improves the signal-to-noise ratio of the sense signal which is generated.

A cryoelectric memory system of relatively large size requires many memory planes to be stacked one over another and each a drive line, for example, may pass over every one of the stacked planes. Prior to the present invention, each $a$ line consisted of a single conductor. There is capacitive coupling between such a conductor and the sense line via the ground plane, the latter acting as a common electrode of the distributed capacitance. Each time a drive current is applied to the $a$ line, a spurious signal is coupled from the $a$ line to the sense line via this capacitance, at each storage location, even if the drive current is only a half-select current for particular memory location. Such signals induce voltages of the same polarity across the outer terminals of the sense line (such voltages are known in the art as "common-mode" noise voltages). The fundamental reason the common-mode noise voltages occur is that successive ground planes in the stack are at slightly different voltages relative to some reference such as ground. One might think that this problem could be eliminated by connecting the ground planes together as, for example, with lengths of wire. However, in practice, it is found that the connections themselves act as distributed inductances, and that voltages build up across these distributed inductances to maintain the ground planes at different voltage levels.

The outer terminals of the sense line are connected to a sense amplifier which is ordinarily a differential amplifier. Accordingly, the common-mode noise voltages, which are of the same polarity at the two input terminals to the sense amplifier, tend to cancel. If the sense signal of interest is relatively large, there may be sufficient concellation of the common-mode noise voltages that they do not affect, to any significant extent, the amplified sense signal. However, in the operation of a practical cryoelectric memory of practical all packing density, the sense amplifier must handle a sense signal of relatively low amplitude. In practice, the sense amplifier has a finite "common-mode rejection" capability at the high gains and bandwidth required in cryoelectric memory systems and, if the common-mode noise is of relatively high amplitude, it appears as an in-mode noise component at the sense amplifier and this noise tends to mask the relatively small sense signal of interest.

In the arrangement of the present invention, the same type of capacitive coupling exists between a drive line such as the $a$ drive line and the sense lines. However, in one embodiment of the present invention, as each drive line consists of two conductors and as current flows in one direction through one of the conductors and in the opposite direction through the other conductor, the common-mode noise voltages capacitively induced into the sense lines tend to cancel. This occurs because the ground planes in this case are at zero potential relative to the now balanced drive lines (outgoing and return paths). Accordingly, the common-mode noise voltage which appears at the outer terminals of the sense lines is substantially entirely eliminated.

There is also so-called "in-mode" noise generated due to capacitive coupling between the drive lines and the sense lines. The generation of in-mode noise results in a voltage of one polarity at one terminal of the sense line and of opposite polarity at the other terminal of the sense line and, of course, is highly disadvantageous as it tends to mask the sense signal. While difficult to measure directly, indirect measurements of the memory systems of the present invention, as well as the mathematical calculations, indicate that such noise is also substantially reduced when the outgoing and return paths of the drive lines of the embodiment of the memory cells of the present invention are employed.

What is claimed is:

1. A cryoelectric storage element comprising, in combination:
   a superconductor ground plane formed with two spaced apertures therein;
   superconductor storage loop means lying on and insulated from the ground plane comprising an input lead, an output lead, and two current paths connected in parallel between these leads, the first of said paths passing over said two spaced apertures, and the second of said paths not passing over either of said apertures; and
   superconductor drive lead means passing over said two paths and between the two apertures in said ground plane, said drive lead means being insulated from both the storage loop means and the ground plane in the region thereof where it passes over the storage loop means, said drive lead means comprising two side-by-side conductors, one an outgoing and the other a return lead both carrying the same drive current, and the portion of each conductor of the drive lead means over said first path being of substantially greater width than the portion of each conductor of the drive lead means passing over said second path.

2. A storage element as set forth in claim 1, wherein said ground plane is formed with a third aperture therein, lying between the first and second apertures, and in the space between the outgoing and return leads.

3. A cryoelectric storage element comprising, in combination:
   a superconductor ground plane formed with two spaced apertures therein;
   superconductor storage loop means lying on and insulated from the ground plane comprising an input lead, an output lead, and two current paths connected in parallel between these leads, the first of said paths passing over said two spaced apertures, and the second of said paths not passing over either aperture; and
   a superconductor drive line means comprising an outgoing and a return conductor, lying side-by-side, each conductor symmetrical about a straight line, and each conductor passing over the two current paths and between the two apertures in the ground plane, each conductor being substantially wider in the region thereof over said first current path than in the region thereof over the second current path, and each conductor being insulated both from the storage loop and the ground plane in the region thereof when it passes over the storage loop.

4. A plurality of arrays of storage elements, each element as described in claim 3, each array on a separate superconductor ground plane, said arrays including a plurality of drive line means, each such means consisting of one outgoing and one return conductor which together comprise a continuous conductor, each continuous conductor passing from plane-to-plane over a group of storage elements on each plane and being folded back on itself and returning along the same path.

5. At least two storage elements as set forth in claim 3 connected in series and with the drive line means for one serving also as the drive line means for the other, whereby the two cells store the same bit and, when sufficient drive current is applied to the drive line means to drive both cells normal, if both initially are storing persistent current they produce a sense signal manifested as a voltage appearing across the two series connected elements which is of substantially larger amplitude than the sense signal produced across a single storage element.

6. The combination as set forth in claim 5, wherein said two storage elements are symmetrically positioned on the ground plane with their second paths immediately adjacent one another and with one cell occupying the mirror image position of the other.

References Cited

UNITED STATES PATENTS

| 3,355,721 | 11/1967 | Burns | 340—173 |
| 3,402,400 | 9/1968 | Sass | 340—173.1 |
| 2,989,714 | 6/1961 | Park | 340—173.1 |
| 3,181,126 | 4/1965 | Green | 340—173.1 |
| 3,346,829 | 10/1967 | Newhouse | 340—173.1 X |

FOREIGN PATENTS 998,792  7/1965  Great Britain.

TERRELL W. FEARS, Primary Examiner

H. L. BERNSTEIN, Assistant Examiner

U.S. Cl. X.R.

307—277; 338—32